United States Patent [19]

Jansky et al.

[11] Patent Number: 5,022,433
[45] Date of Patent: Jun. 11, 1991

[54] SHUT-OFF VALVE

[75] Inventors: Jaroslav Jansky, Rosenheim; Angelika B. M. Temmesfeld, Raubling, both of Fed. Rep. of Germany

[73] Assignee: Temtech Fahrzeugtechnik Entwicklungsgesellschaft MBH, Fed. Rep. of Germany

[21] Appl. No.: 364,241

[22] Filed: Jun. 9, 1989

[30] Foreign Application Priority Data

Jun. 9, 1988 [DE] Fed. Rep. of Germany ....... 3819689

[51] Int. Cl.$^5$ .................... B65B 31/06; F16K 24/00
[52] U.S. Cl. .................... 137/588; 220/85 VR; 220/85 VS; 220/86.1; 141/59; 141/302
[58] Field of Search .................... 137/587, 588; 220/85 VR, 85 VS, 86 R; 141/59, 302

[56] References Cited

U.S. PATENT DOCUMENTS

| 1,529,187 | 3/1925 | Keilholtz | 137/587 |
| 4,630,749 | 12/1986 | Armstrong | 220/85 VR X |
| 4,651,889 | 3/1987 | Uranishi et al. | 137/588 X |
| 4,690,293 | 9/1987 | Uranishi et al. | 220/86 R |
| 4,701,198 | 10/1987 | Uranishi et al. | 137/587 X |
| 4,706,708 | 11/1987 | Fornuto et al. | 137/588 |
| 4,714,172 | 12/1987 | Morris | 220/86 R |
| 4,715,509 | 12/1987 | Ito et al. | 220/85 VS |
| 4,719,949 | 1/1988 | Mears | 137/587 X |
| 4,724,861 | 2/1988 | Covert et al. | 137/588 X |
| 4,747,508 | 5/1988 | Sherwood | 220/85 VR |
| 4,765,504 | 8/1988 | Sherwood et al. | 220/86 R |
| 4,770,677 | 9/1988 | Harris | 220/85 VR |
| 4,809,863 | 3/1989 | Woodcock et al. | 220/85 VS |

Primary Examiner—John Rivell
Attorney, Agent, or Firm—Darby & Darby

[57] ABSTRACT

A shut-off valve in a gas line leading to a fuel tank of a motor vehicle, comprising a valve seat and a valve body which is movable by means of the opening and closing movement of a fuel tank lock. In order to provide a valve which opens a large flow cross-section in the open position, it is provided that the valve body comprises a flexible diaphragm which is pretensioned against the valve seat, an actuating lever being fastened at the side of the diaphragm remote of the valve seat, the free end of the actuating lever communicating with a tappet which is movable transversely relative to the longitudinal axis of the actuating lever and is coupled with the fuel tank lock. The valve seat is enclosed by an annular space which can be completely covered by the diaphragm, wherein the annular space communicates with a branch of the gas line and the interior space of the valve seat communicates with the other branch of the gas line.

8 Claims, 2 Drawing Sheets

SHUT-OFF VALVE

FIELD OF THE PRESENT INVENTION

The invention is directed to a shut-off valve in a gas line leading to a fuel tank of a motor vehicle, comprising a valve seat and a valve body which is movable by means of the opening and closing movement of a fuel tank lock.

BACKGROUND OF THE PRESENT INVENTION

A valve of the type referred to above is known from European application EP-A-223 051. This known valve is located in the venting line of a fuel tank of a motor vehicle. The valve body is pressed against the valve seat by means of opening movement of a locking flap of the fuel tank lock, so that the valve is closed and the connection between the gas space of the fuel tank and the external surroundings is accordingly interrupted. Accordingly, an air pocket always remains in the fuel tank for reasons of safety. The known valve is only suitable for a tank venting line, i.e., a gas line along which very small amounts of gas must flow per unit of time. The known valve is accordingly not suitable for a system in which the gasoline vapor displaced from the tank during fueling of a motor vehicle is directed to an activated charcoal adsorption filter.

Such a device for intercepting fuel vapors during the filling a fuel tank is known German Patent Application DE-A-37 04 641. In the known device, the valve is a magnetic valve which is actuated via a protective pipe contact controlled by means of the locking flap. Such a solution is costly and expensive and, moreover, has the disadvantage that the vehicle can no longer be filled with fuel during failure of the magnetic valve. The possibility of a mechanical actuation of the shut-off valve is also described in this application.

SUMMARY OF THE PRESENT INVENTION

The invention has as a primary object providing a shut-off valve of the general type mentioned above which is distinguished by high operating reliability and which is suitable for opening a large flow cross-section in its open position.

This object is achieved in that the valve body comprises a flexible diaphragm which is pretensioned against the valve seat, an actuating lever being fastened at its side remote from the valve seat, the free end of the actuating lever engaging with a tappet which is coupled with the fuel tank lock and movable transversely relative to the longitudinal axis of the actuating lever, and in that the valve seat is enclosed by an annular space which can be completely covered by the diaphragm, wherein the annular space communicates with a branch of the gas line and the interior space of the valve seat communicates with the other branch of the gas line.

For a better understanding of the present invention, reference is made to the following description and accompanying drawings while the scope of the invention will be pointed out in the appended claims.

DESCRIPTION OF THE PREFERRED EMBODIMENTS

Figure 1:
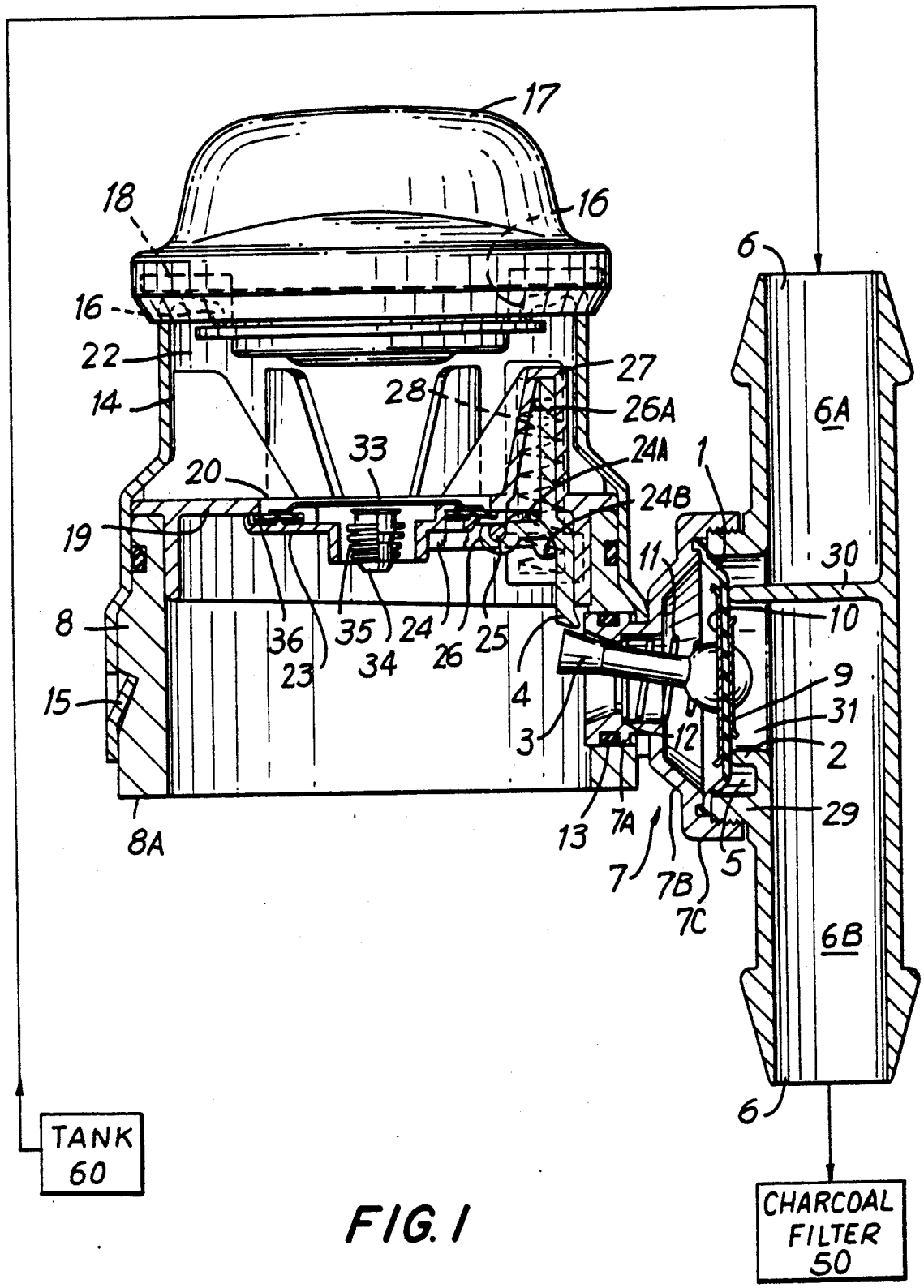
FIG. 1 shows a side sectional view of the valve with cap of the present invention.
Figure 2:
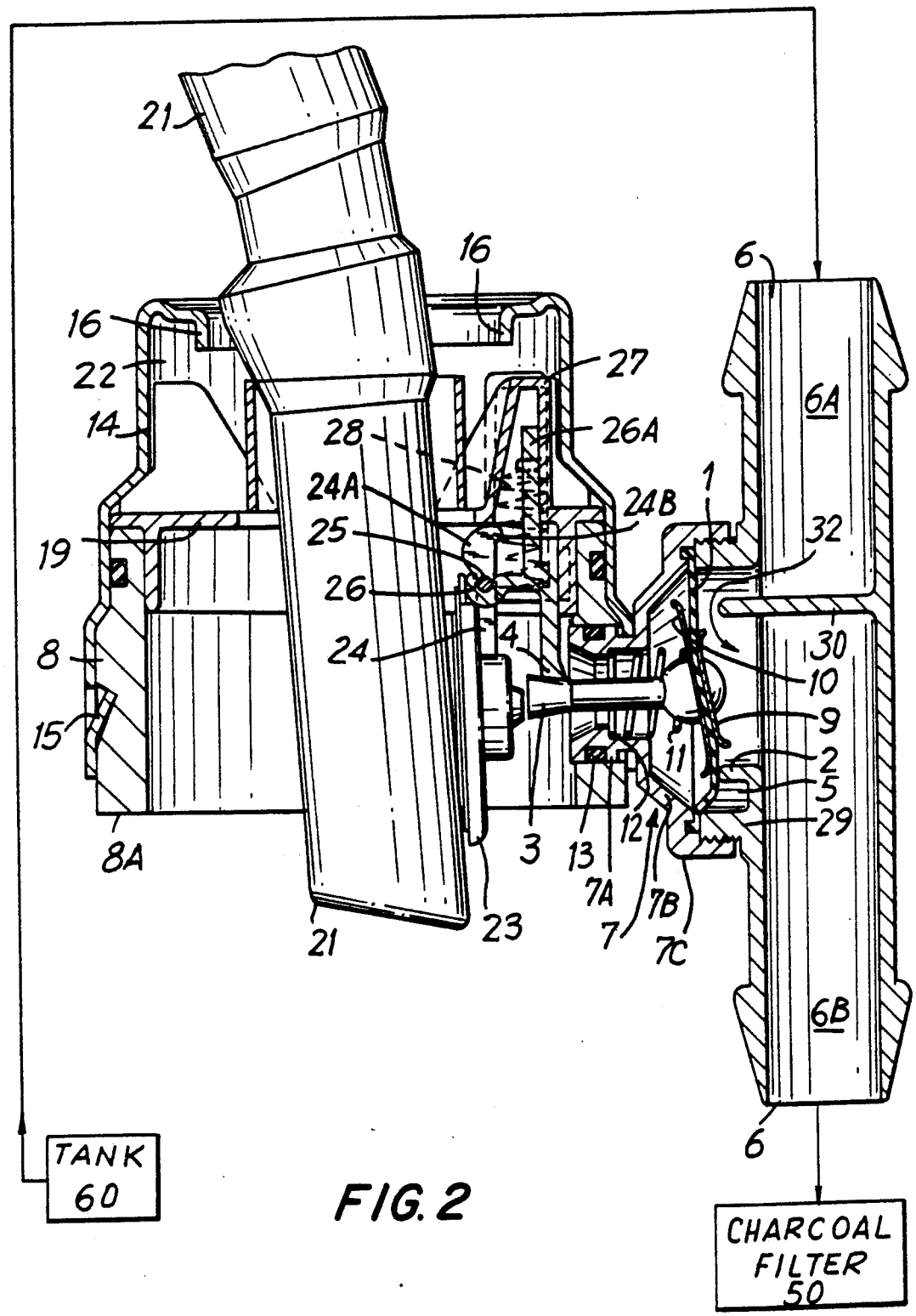
FIG. 2 shows a side sectional view of the valve of FIG. 1 after insertion of a filling gun.

The end piece of a fuel filling neck 8 can be seen in the FIGS. 1 and 2. FIG. 1 shows the valve with tank cap 17 and FIG. 2 shows the valve after removal of the tank cap 17 and insertion of the filling gun 21. During the manufacture of a motor vehicle, the end piece of the fuel filling neck 8 is welded by its lower edge 8A to a pipe leading to the fuel tank of the vehicle. A metal pipe 14 having a plurality of a taper steps is clipped on the fuel filling neck by means of a catch device 15. The metal pipe 14 comprises two turned-up rim areas 16 which form a part of an internal bayonet lock. A tank cap 17 is arranged on this internal bayonet lock with the intermediary of a seal 18. A dividing wall 19 with a central hole 20, whose diameter is adapted to the diameter of a fuel filling gun 21, fits on the end edge of the fuel filling neck 8, which end edge faces the internal bayonet lock. A guide part 22 for the fuel filling gun 21 is located between the dividing wall 19 and the internal bayonet part 16.

The hole 20 in the dividing wall 19 is closed by means of a swivel flap 23 of a self-closing fuel tank lock. The swivel flap 23 can be pressed into the open position (shown in FIG. 2) by means of inserting the fuel filling gun 21.

For the swivelable support of the swivel flap 23, a swivel arm 24 is fastened at its lower side, which swivel arm 24 comprises two parallel webs. The swivel arm 24 extends beyond the outer edge of the swivel flap 23 at one side of the latter. The swivel arm 24 comprises a protuberance 24A at its end area, which protuberance 24A passes into a surface 24B which is curved on the front side. The end area of the swivel arm is supported at the dividing wall with protuberance 24A, which dividing wall extends vertically relative to the longitudinal axis of the fuel filling neck, in such a way that the movement of the end area of the swivel arm is defined in the direction of the opening area of the fuel filling neck; but, on the other hand, the swivel arm is movable, in principle, in the opposite direction, that is in the direction of the interior of the fuel filling neck. The supporting surface of the dividing wall 19 is planar, so that the protuberance 24A and the curved control surface 24B at the front side can slide along the dividing wall 19 acting as supporting surface.

A transverse pin 25, which connects the two webs of the swivel arm 24, is arranged in the area between the swivel flap 23 and the protuberance 24A of the swivel arm 24. A hook 26, whose prolongation 26A projects into a spring housing 27 and is guided in the axial direction, is hinged at the transverse pin 25. The hook 26 is pretensioned in the direction of the housing 27 by means of two springs 28. The hook 26 passes into a tappet 4 which faces in the direction of the interior of the fuel filling neck.

The swivel flap 23 is equipped with an overpressure safety valve. The safety valve comprises a plate 22, a pin 34 a pressure spring 35 and an elastic seal 36. The plate 33 is pretensioned in the direction of the swivel flap from its outer side by means of the pin 34 and the pressure spring 35. The seal 36 contacts the edge of the hole 20 of the dividing wall 19 in an elastic manner. When the swivel flap is open, the tight connection between the swivel flap 23 and the dividing wall 19 is maintained during the initial phase of the movement.

The fuel tank lock described to this extent works as follows: In order to refuel the motor vehicle, the tank cap 17 is loosened by means of counterclockwise rotation and is removed. Depending on use, particularly if the motor vehicle comprises an outer flap covering the fuel filling neck, the tank cap 17 can also be dispensed with. In this case, a flow-off bore hole (not shown) is provided in the metal pipe 14 directly above the dividing wall 19.

The swivel flap 23 is pressed downward by means of introducing the fuel filling gun 21 and occupies the position shown in dashes. In so doing, the end of the swivel arm 24, that is, the protuberance 24A and the control surface 24B, slides along the dividing wall 19, which acts as a supporting surface, until the swivel arm is located in the open position which is swiveled by 90°, and it is supported at the dividing wall 19 only by its control surface 24B at the front side. Because of the special shape of the protuberance 24A and the control surface 24B, the transverse pin 25 moves in the direction of the interior of the fuel filling neck, and the hook 26, its prolongation 26A and the tappet 4 follow this movement, wherein the prolongation 26A is guided in the spring housing 27 in the axial direction. The springs 28 are accordingly pressed together in the spring housing 27.

A fuel tank lock with such a swivel flap is described in more detail in the German Patent Application DE-A-37 21 049, whose contents are accordingly incorporated herein by reference.

The axial movement of the tappet 4 caused by the opening and closing movement of the swivel flap 23 is made use of for the actuation of the shut-off valve as described below.

The shut-off valve comprises a housing 7 with a cylindrical end portion 7A. A radial bore hole, whose clear width corresponds to the diameter of the cylindrical end portion 7A of the housing 7, is located in the wall of the fuel filling neck 8. The cylindrical end portion 7A fits in this radial bore hole, wherein an O-ring 13, which is supported in an annular groove, provides for a tight fit. The metal pipe 14 comprises a U-shaped recess at the location of the radial bore hole, which recess grasps the cylindrical end portion 7A of the housing 7 in a groove and fixes it axially.

Outside the fuel filling neck, the housing 7 passes into a funnel-shaped portion 7B which follows a capsule-shaped portion 7C.

A gas line 6, whose longitudinal axis lies vertically with respect to the longitudinal axis of the shut-off valve, runs past the capsule-shaped portion. In the drawing, the longitudinal axis of the gas line 6 runs parallel to the longitudinal axis of the fuel filling neck 8 for reasons of clarity in the drawing. In practice, however, the gas line 6 generally lies with its longitudinal axis vertical to the longitudinal axis of the fuel filling neck 8 and, accordingly, vertically with respect to the drawing plane. The gas line 6 comprises a joining piece 29 which projects in the radial direction and fits into the capsule-shaped portion 7C of the housing and is connected with the latter via a screw thread. A valve seat 2 is located within the joining piece 29, the diameter of the valve set 2 being smaller than the clear width of the joining piece, so that an annular space 5 results between the joining piece 29 and the valve seat 2. The gas line 6 is divided into two branches 6A and 6B by means of a dividing wall 30. The position of the dividing wall 30 is selected in such a way that it lies tangentially relative to the circular valve seat 2. The branch 6B is connected with the interior space of the valve seat 2 by means of an opening 31 in the wall of the gas line 6. A corresponding opening 32 connects the branch 6A with the annular space 5.

The valve seat 2 and the annular space 5 are continuously covered with a flexible diaphragm 1. The rim of the diaphragm is clamped in between the portions 7C and 29, which are screwed together wherein an end flange of the diaphragm on the rim side engages in a circumferentially extending groove in order to ensure a secure fit of the diaphragm. Plate-shaped stiffening parts 9 and 10 are arranged at the two sides of the diaphragm. The stiffening part 10, which is remote of the valve seat, is dimensioned in such a way that it covers the valve seat 2, while the stiffening part 9 lying on the side of the valve sear 2 has a somewhat smaller diameter than the valve seat 2. A pressure spring 11, which presses the diaphragm 1 against the valve seat 2, is supported between the stiffening part 10 and an internal shoulder in the cylindrical end portion 7A of the housing 7. An actuating lever 3, which is fastened by one end at the plate-shaped stiffening part 10 of the diaphragm 1, extends through the helical pressure spring 11. The axis of the actuating lever 3 is inclined somewhat relative to the axis of the pressure spring 11 and accordingly relative to the axis of the cylindrical end portion 7A of the housing 7, specifically in the direction of the open end of the fuel filling neck.

The branch 6A of the gas line 6 is connected with the fuel tank or a compensating tank 60 by a hose. The branch 6B of the gas line 6 communicates in a similar manner with an activated charcoal filter 50.

The shut-off valve works as follows: When the fuel filling neck is closed, the free end of the actuating lever 3 is unloaded, so that the diaphragm 1 is pressed against the valve seat 2 by means of the pressure spring 11 and the annular space 5 is separated in a tight manner from the interior space of the valve seat 2. Consequently, the line branches 6A and 6B are also separated from one another and the connection between the activated charcoal filter and the fuel tank or compensating tank is interrupted, so that the activated charcoal filter can be rinsed.

When filling the vehicle with fuel, the tappet 4 moves—as described above—in the direction of the actuating lever 3 as a result of the insertion of the fuel filling gun 21, so that the actuating lever 3 is swiveled into the position shown in dashes. In so doing, the diaphragm 1 is lifted on one side from the valve seat 2 accompanied by the bending of the pressure spring 11, so that the annular space 5 is connected with the interior space of the valve seat 2. As a result, fuel vapors which are displaced from the fuel tank as a consequence of the filling with fuel reach the activated charcoal filter, where they are adsorbed.

Since the tight connection between the swivel flap 23 and its seat is maintained during a short initial phase of the opening movement of the swivel flap 23, the diaphragm 1 of the shut-off valve is lifted from its seat 2 before the fuel tank lock is opened. Vapors under the influence of overpressure can therefore be conducted out of the fuel tank into the activated charcoal filter before opening the fuel tank lock.

In the shut-off valve, according to the invention, the actuating side, i.e. that side at which the actuating lever is arranged, is completely separated from the two gas line branches. Accordingly, a reliable separation is ensured in the event of an accident, as well. Moreover, an overpressure in the fuel tank filling neck loads the diaphragm so as to provide for separation of the two gas line branches 6A and 6B, which results, moreover, in increased reliability.

As described in detail above, a valve which is coupled with the mechanical opening and closing movement of a fuel tank lock and which is distinguished by high operating reliability is provided by the shut-off valve according to the invention. The susceptibility to disturbance which results in shut-off valves, according to the prior art, because of the use of electrical parts, such as protective pipe contacts and actuating magnets, is avoided. When the valve is actuated, the flexible diaphragm is lifted at one side from its valve seat, while it is supported, as before, on the other side of the valve seat. Surprisingly, however, a large flow cross-section is opened which is sufficient for the gas quantity which flows into an activated charcoal adsorption filter from the fuel tank during the fueling of a motor vehicle. It is significant that in the shut-off valve, according to the invention, the entire opening movement of the fuel tank lock can be utilized for actuating the shut-off valve, i.e., for lifting the diaphragm from its valve seat by position. Since the interior space of the valve seat, as well as the annular space, is covered by the diaphragm, according to the invention, it is ensured that when there is overpressure in the fuel filling neck (e.g. as a result of an automobile accident) the shut-off valve is additionally loaded in the closing direction by means of this overpressure, so that a reliable separation between the two branches of the gas line is ensured and, accordingly, no fuel can flow into the activated charcoal filter. It is also ensured by means of the solution, according to the invention, that the space between the gas line and the interior space of the fuel filling neck, from which location the actuation of the shut-off valve is effected, are reliably separated from one another and no fluid connection os produced, not even when the valve is opened (when the fuel tank is open).

Since the entire opening movement of the fuel tank lock is utilized for actuating the shut-off valve in the shut-off valve according to the invention, it can be ensured that the shut-off valve opens at the same time as the fuel tank lock. A gas volume subjected to overpressure in the interior of the tank is therefore conducted off immediately when the fuel tank lock is actuated as a result of the opening of the shut-off valve. This is achieved in a reliable manner particularly when—according to an advantageous embodiment form—the fuel tank lock is sealed in an elastic manner and a mechanical coupling between the fuel tank lock and the shut-off valve which is as free of play as possible is provided for. Accordingly, it can be achieved that the shut-off valve opens even earlier than the fuel tank lock, so that the pressure compensation is completed before the fuel tank lock is open. The risk that fuel will spill out of the filling neck when the fuel tank is open as a result of the internal pressure in the tank is reliably prevented.

According to an advantageous embodiment form of the invention, it is provided that the shut-off valve comprises a housing with a cylindrical end portion which can be inserted into a radial bore hole of the fuel filling neck, and that the actuating lever projects over the cylindrical end portion. In so doing, the actuating lever projects somewhat into the interior space of the fuel filling neck and can be moved by means of a tappet which is moved in the axial direction toward the free end of the actuating lever as a result of the opening movement of the fuel tank lock. In order to ensure a tight fit of the cylindrical end portion of the housing of the shut-off valve in the radial bore hole of the fuel filling neck, an annular groove is provided with an O-ring at the cylindrical end portion according to another advantageous construction of the invention.

Further, it is advantageous if the diaphragm comprises at least one plate-shaped stiffening part in its central area. This plate-shaped stiffening part can be used for the fastening of the actuating lever. When the actuating lever is swiveled by means of opening the fuel tank lock, it is ensured by means of the stiffening part that the diaphragm is lifted from its valve seat along a large surface area.

According to another advantageous embodiment form of the invention, it is provided that the diaphragm is loaded by pressure spring in the direction of the valve seat, the pressure spring being supported at a shoulder in the interior of the cylindrical end portion. It is ensured by means of the spring that the valve remains closed up to a certain allowed pressure. During the actuation of the shut-off valve via the actuating lever, the spring is not only compressed, but is curved relative to the longitudinal axis.

While the foregoing description and drawings represent the preferred embodiments of the present invention, it will be obvious to those skilled in the art that various changes and modifications may be made therein without departing from the true spirit and scope of the present invention.

What is claimed is:

1. A shut-off valve in a gas line leading to a fuel tank of a motor vehicle, comprising: a valve seat and a valve body which is movable by means of the opening and closing movement of a fuel tank lock; said valve body including a flexible diaphragm which is pretensioned against the valve seat; an actuating lever having a free end being fastened at the side of the diaphragm remote of the valve seat, the free end of the actuating lever communicating with a tappet which is movable transversely relative to the longitudinal axis of the actuating lever and is coupled with the fuel tank lock; said valve seat being enclosed by an annular space which can be completely covered by the diaphragm, wherein the annular space communicating with a branch of the gas line and the interior space of the valve seat communicates with another branch of the gas line.

2. A shut-off valve according to claim 1, wherein the fuel tank lock is sealed in an elastic manner, and wherein the coupling between the tappet and the tank lock, as well as the connection between the tappet and the actuating lever, has the slightest possible play.

3. A shut-off valve according to claim 1 or 2, wherein the valve comprises a housing with a cylindrical end portion which is insertable in a radial bore hole of a fuel filling neck and in that the actuating lever projects over the cylindrical end portion.

4. A shut-off valve according to claim 3 wherein an annular groove is provided in the cylindrical end portion, an O-ring fitting in the annular groove.

5. A shut-off valve according to claim 1 wherein the diaphragm comprises at least one plate-shaped stiffening part in its central area.

6. A shut-off valve according to claim 3 wherein the diaphragm is loaded in the direction of the valve seat by means of a pressure spring, which pressure spring is supported at a shoulder in the interior of the cylindrical end portion.

7. A shut-off valve according to claim 1, wherein the diaphragm seals the space of the valve communicating with the interior space of a fuel filling neck relative to the gas line.

8. A shut-off valve according to claim 1, wherein the other branch of the gas line is connected with an activated charcoal adsorption filter.

* * * * *